United States Patent
Habib et al.

(10) Patent No.: US 11,776,232 B2
(45) Date of Patent: Oct. 3, 2023

(54) VIRTUAL 3D POINTING AND MANIPULATION

(71) Applicant: Adobe Inc., San Jose, CA (US)

(72) Inventors: Kazi Rubaiat Habib, Seattle, WA (US); Tianyi Wang, West Lafayette, IN (US); Stephen DiVerdi, Berkeley, CA (US); Li-Yi Wei, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/666,806

(22) Filed: Feb. 8, 2022

(65) Prior Publication Data
US 2023/0252746 A1 Aug. 10, 2023

(51) Int. Cl.
*G06T 19/20* (2011.01)
*G06T 7/73* (2017.01)
*G06T 15/20* (2011.01)
*G06F 3/04815* (2022.01)

(52) U.S. Cl.
CPC .......... *G06T 19/20* (2013.01); *G06F 3/04815* (2013.01); *G06T 7/73* (2017.01); *G06T 15/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 11,317,060 B1* | 4/2022 | Libin | H04N 7/157 |
| 2006/0170652 A1* | 8/2006 | Bannai | G06F 3/011 |
| | | | 345/156 |
| 2012/0192077 A1* | 7/2012 | Castellani | H04N 1/00344 |
| | | | 715/740 |

OTHER PUBLICATIONS

Ishii, Hiroshi et al. "Clearboard: A Seamless Medium for Shared Drawing and Conversation with Eye contact", Proceedings of the SIGCHI conference on Human factors in computing systems, May 1992, pp. 525-532 and 2 pages.

(Continued)

*Primary Examiner* — Frank S Chen
(74) *Attorney, Agent, or Firm* — Kilpatrick Townsend & Stockton LLP (57) ABSTRACT

Certain aspects and features of this disclosure relate to virtual 3D pointing and manipulation. For example, video communication is established between a presenter client device and a viewer client device. A presenter video image is captured. A 3D image of a 3D object is rendered on the client devices and a presenter avatar is rendered on at least the viewer client device. The presenter avatar includes at least a portion of the presenter video image. When a positional input is detected at the presenter client device, the system renders, on the viewer client device, an articulated virtual appurtenance associated with the positional input, the 3D image, and the presenter avatar. A virtual interaction between the articulated virtual appurtenance and the 3D image appear to a viewer as naturally positioned for the interaction with respect to the viewer.

20 Claims, 8 Drawing Sheets

(56) References Cited

OTHER PUBLICATIONS

Mock, Philipp, et al. "Direct 3D-Collaboration with Face2Face-Implementation Details and Application Concepts", 2012 3DTV-Conference: The True Vision-Capture, Transmission and Display of 3D Video (3DTV-CON). IEEE, 2012, 4 pages.

Zillner, Jakob, et al. "3D-Board: A Whole-Body Remote Collaborative Whiteboard", Proceedings of the 27th annual ACM symposium on User Interface Software and Technology. 2014, 9 pages.

\* cited by examiner

VIRTUAL 3D POINTING AND MANIPULATION

TECHNICAL FIELD

The present disclosure generally relates to three-dimensional (3D) imaging. More specifically, but not by way of limitation, the present disclosure relates to programmatic techniques for integrating 3D images with live video presentations so that the images can be referenced from client devices.

BACKGROUND

Video-based interaction is playing an increased roll in person-to-person collaboration and meetings. Most videoconferencing systems provide for screen sharing and collaboration around digital content. For example, videoconferencing participants routinely present documents to other participants and some systems even provide for interactive markup and editing of shared documents. However, existing systems using common computing devices and cameras do not provide a natural way for people to jointly interact with 3D images. And virtual-reality (VR) based systems require significant additional hardware and processing power, maintain independent perspectives, and do not communicate facial expressions.

In a typical videoconference where an image of a 3D object is presented, the 3D image is manipulated by only one participant at a time. Often, the 3D image is shown separately from images of the participants in the videoconference. Pointing gestures and other body movements are ignored. Even in VR-based systems where a 3D image appears between participants, the participants view the image from their own perspectives and the 3D image can occlude the view of other participants. None of these systems approximate the experience of standing in a room and being able to walk around an object to stand next to a colleague and see where the colleague is pointing. Nor do any of these systems approximate an in-person meeting, where multiple attendees sit on the same side of a display or the object itself so that everyone enjoys the same perspective.

SUMMARY

Certain aspects and features of the present disclosure relate to virtual 3D pointing and manipulation. For example, a computer-implemented method involves establishing video communication between a first client device and a second client device and capturing a presenter video image at the first client device. The method further involves rendering a 3D image of a 3D object on the first client device and on the second client device and rendering a presenter avatar on at least the second client device. The presenter avatar includes at least a portion of the presenter video image. The method further involves detecting a positional input at the first client device. The positional input is indicative of an interaction with the 3D image. The method further involves rendering, on the second client device, in response to the positional input, an articulated virtual appurtenance connectably associated with the positional input, the 3D image, and the presenter avatar, the articulated virtual appurtenance and the 3D image being naturally positioned for the interaction with respect to the second client device.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As described above, existing methods of presenting 3D content in a videoconference or video presentation system using common computing devices and cameras do not provide a natural way for people to jointly interact with 3D images. Pointing gestures and other body movements are ignored. VR-based systems require significant additional hardware and processing power, maintain independent perspectives, and do not communicate facial expressions. VR systems may also restrict a user's access to typical videoconference communication tools such as chat and attendee viewing modes. Embodiments described herein address these issues by using a video image captured at a client device to generate a video avatar, and rendering the video avatar and a 3D image of a 3D object on one or more viewer client devices. These client devices, as an example, are interconnected using a presentation application such as one designed for videoconferencing. A positional input can be received by the system as an indication that the presenter client device is detecting an interaction with the 3D image. When this input is detected, the presenter video avatar and the image of the 3D object on the viewer client devices are rotated, moved, or otherwise rendered or re-rendered so that remote views of this interaction are displayed from an appropriate point of view for interacting with the 3D object at the respective device. Additionally, an articulated virtual appurtenance is displayed and/or moved to substantially replicate the interaction, but from a natural perspective for viewing on the remote client devices. This articulated virtual appurtenance links a video avatar to the virtual 3D object so that the display on a remote client device naturally indicates which user is interacting with the virtual object. An "appurtenance" is an accessory object connected with some action. Thus, an articulated virtual appurtenance is an image indicative of the interaction with the virtual 3D object, for example, a robotic arm, an articulated pointer, a realistic arm, or a collection of connected lines.

For example, a videoconferencing application executes on multiple client devices so that users of the various client devices can collaborate regarding the engineering or design of an object such as a machine or a consumer article. Video communication is established between the client devices. The videoconferencing application may be executed on two client devices that are directly communicating with each other. Alternatively, the application or a portion of the application may be executed on two or more client devices that are interconnected through a local server, or that are connected through a remote server or cloud computing system designed to work with the client applications. A 3D image of the object of interest is loaded into the application(s) and can be displayed on respective client devices as if users are sitting around the object, with each client device displaying the 3D object from that device's perspective.

Continuing with this example, video is captured by a webcam at each client device and used to generate a video avatar corresponding to each client device. These video avatars are not abstract representations, but are rather small, live video images of what each webcam "sees." Video avatars are rendered on each client device to replicate the look and feel of the participants sitting or standing around the 3D object, so that each client device displays live facial expressions and facial movements. Each client device is connected to, or includes, a motion-sensing device. For example, the webcam itself may act as a motion sensing device in addition to capturing video. Alternatively, a relatively inexpensive, desktop, visible light or IR camera-based position sensing device may be used. Each client device can receive input through its motion-sensing device and the system can virtually rotate or move the 3D object in response to detected motion. Further, if a certain, preselected action is detected by a motion-sensing device, for example, a user pointing to a specific location on the 3D image, the 3D images on all other client devices are automatically rotated to the same perspective. Additionally, a virtual appurtenance, such as an animated image of an articulated pointer or a robotic arm, is automatically generated and rendered by the system as linking the relevant point on the 3D object to the presenter video avatar. This combination of features is arranged to display a view of the interaction on a viewer client device as if a viewer had walked around the object to see where the presenter is pointing, while still being able to see the presenter's facial expression as represented by the viewer video avatar. Optionally, these features can be rendered in a virtual 3D space such as a meeting room or factory.

In some examples, the virtual 3D object is rotated on the viewer client device so that the surface corresponding to the detected gesture is displayed. The presenter video avatar and/or the 3D image of the object may be resized and/or moved to a position where both the video avatar and the virtual interaction with the 3D image are clearly displayed. This positioning minimizes occlusion of one by another of the image of the 3D object, the virtual appurtenance, or the presenter video avatar. In some examples, a force model of interactions between the 3D image and the video avatars corresponding to the participant client devices is used to ensure all video avatars and the 3D object are visibly displayed on all client devices, while tying the presenter video avatar to the point of interaction with the virtual 3D object for rendering the virtual appurtenance as articulated around the object as necessary to minimize occlusion.

The use of the force model provides a system that can efficiently present relatively complex 3D interactions detected through multiple client devices in real time or near real time with standard video presentation hardware. Moreover, because the relevant physical object does not need to be actually positioned in front of meeting participants with viewpoints that are fixed by each one's location in space and around the object, the virtual viewpoint for each participant can be changed to provide all viewers with the same, equally good view, something that is difficult to accomplish with a physical meeting experience.

Figure 1:
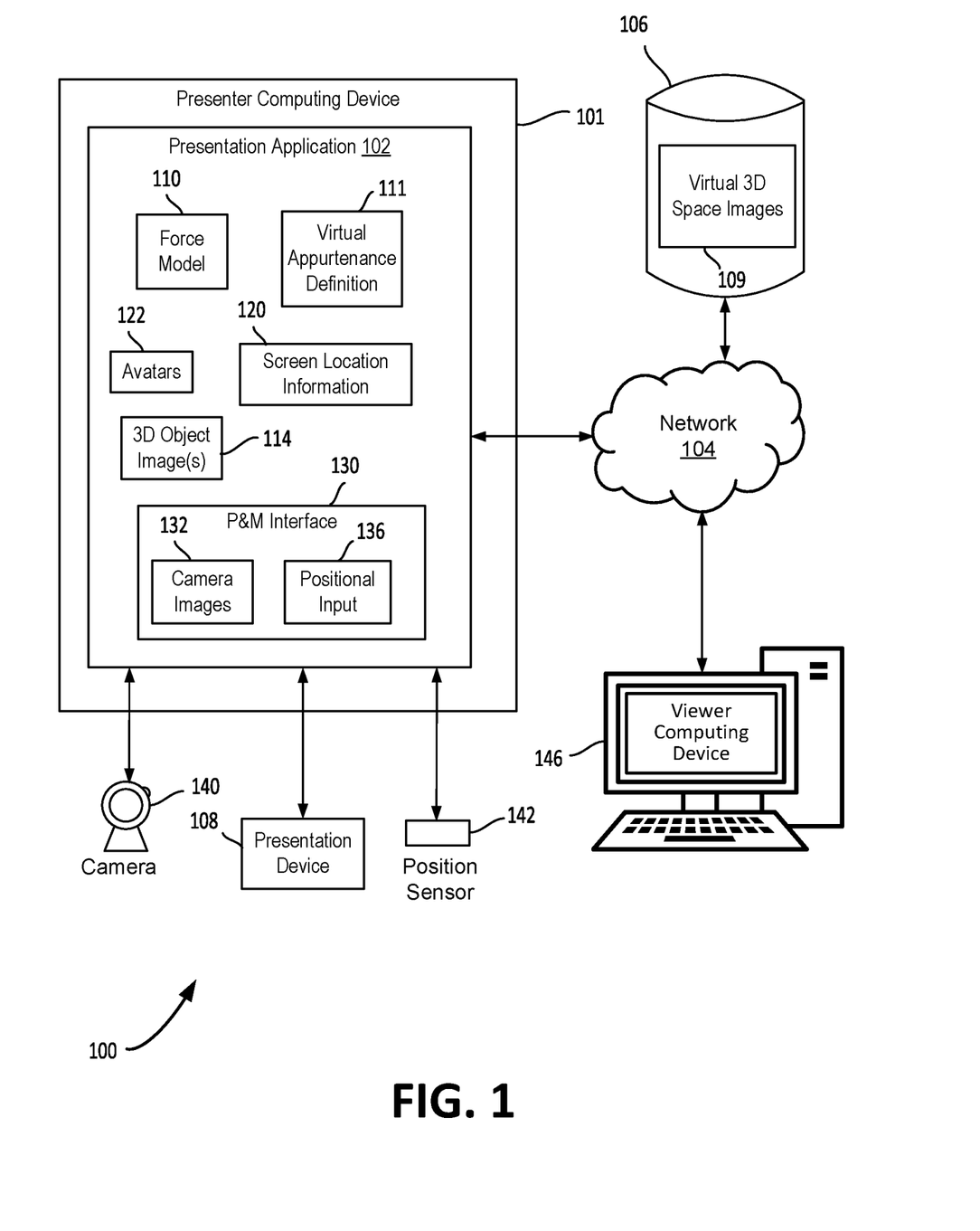
FIG. 1 is a diagram showing an example of a computing environment for virtual 3D pointing and manipulation according to certain embodiments.

FIG. 1 is a diagram showing an example of a computing environment 100 for 3D pointing and manipulation, according to certain embodiments. The computing environment 100 includes a presenter computing device 101 that executes a presentation application 102, a memory device 106 configured to store virtual 3D space images 109, and a presentation device 108 that is controlled based on the presentation application 102. Memory device 106 in this example is connected to presenter computing device 101 via network 104. In some examples, presentation application 102 is a videoconferencing application. In other examples, presentation application 102 is an educational instruction application. In the example of FIG. 1, the presentation application 102 includes force model 110. In some examples, force model 110 is used to calculate virtual, attractive and/or repulsive forces between display features in order to maintain an optimal arrangement with minimal occlusion. Further details of force model 110 are discussed with respect to FIG. 5. Presentation application 102 also includes a definition 111 of an articulated virtual appurtenance that is rendered by the presentation application to represent interaction with a displayed 3D object. Images 114 of such 3D objects are at least temporarily stored by presentation application 102 for display, as are current video avatars 122. Screen location information 120 defines positions of these display features and is updated during a presentation or videoconference while computing device 101 positions the features using force model 110.

The presentation application 102 also generates a pointing and manipulation (P & M) interface 130. In some embodiments, the presentation application 102 uses, as inputs, camera images 132 received from camera 140, for example, a webcam, as well as positional input 136 from position sensor 142. These inputs are used by presentation application 102 to generate video avatars 122 to detect interactions with 3D object images 114, and to render appropriate display features, including, as needed, a virtual appurtenance based on stored definition 111. These display features may be rendered on a viewer computing device 146 connected to presenter computing device 101 via network 104. In this example, for clarity, computing device 101 is referred to as a presenter computing device and computing device 146 is referred to as a viewer computing device. However, these designations are arbitrary and only made for convenience with respect to the description herein. All of the visual display features discussed herein can be displayed on both computing devices simultaneously, or on many computing devices simultaneously. In a typical system, each computing device will include similar hardware and changes roles between that of a presenter computing device and a viewer computing device depending on what is happening in a virtual collaboration. Also, each computing device may display the same features, arranged in either the same or different ways.

Figure 2:
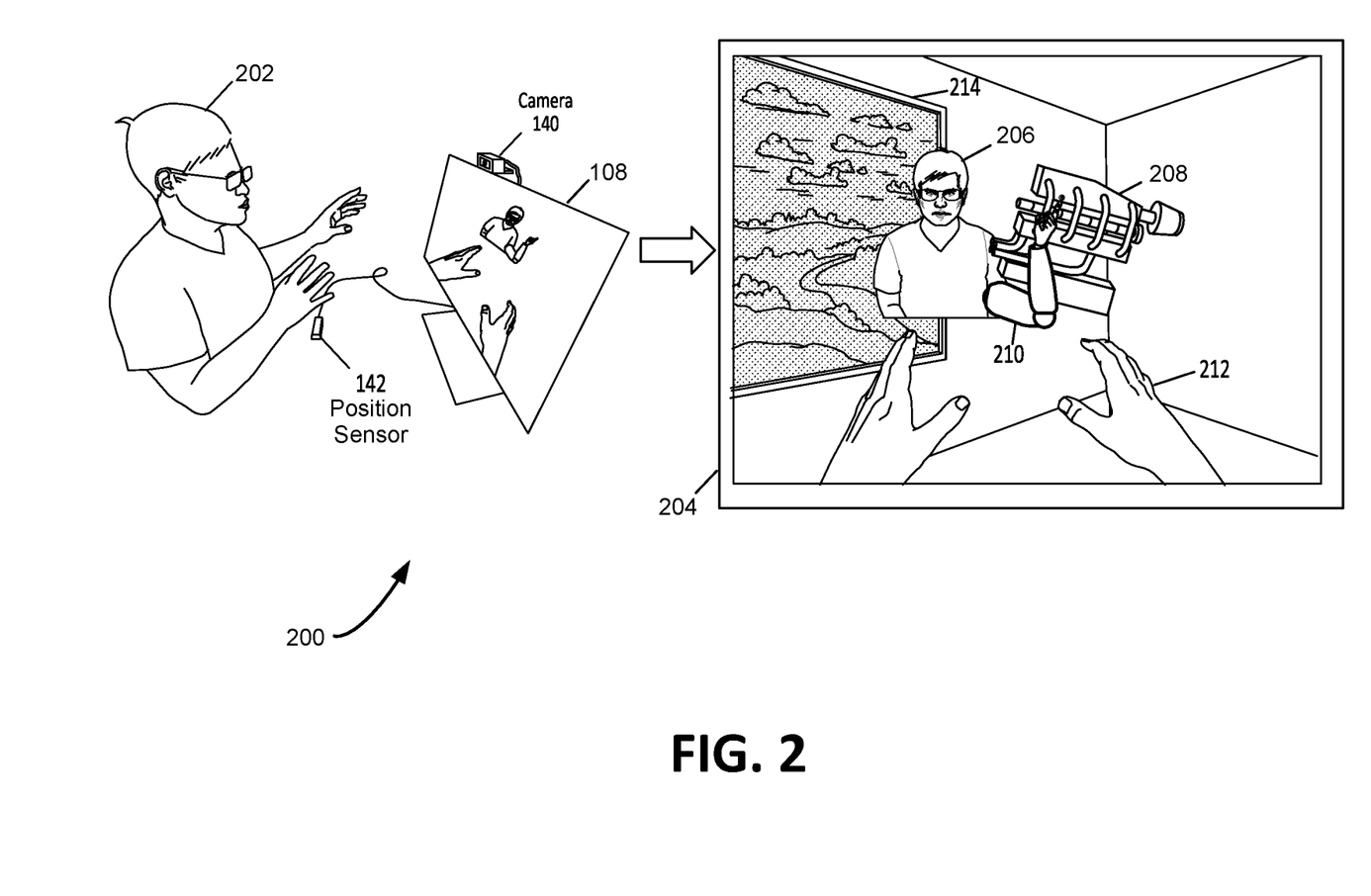
FIG. 2 is an example of system for virtual 3D pointing and manipulation according to certain embodiments.

FIG. 2 is an example of system 200 for virtual 3D pointing and manipulation according to certain embodiments. System 200 includes a presentation device 108 and a camera 140. System 200 also includes a position sensor 142. In this example, position sensor 142 is a small, desktop sensor that includes visible light and IR cameras to detect positioning and movement of a user, in this case, viewing participant 202. For example, a Leap Motion® controller obtained from Ultraleap, Ltd. of Mountain View, Calif., USA, can serve as a position sensor. It should be noted that a webcam or any other camera may serve as a position sensor or as both an imager and a position sensor through the use of an RGB tracking algorithm built into the camera's firmware, the presentation application, or a device driver.

System 200 is pictured with a magnified view 204 of the display area of presentation device 108. Presentation device 108 is rendering an image including presenter video avatar 206, 3D image 208 of an object under consideration, and articulated virtual appurtenance 210. In this example, virtual hands 212 are also depicted and are rendered using information from position sensor 142 to match movements made by viewing participant 202. Articulated virtual appurtenance 210 in this example is a robotic arm. However, such an appurtenance could take many forms. For example, an articulated pointer, a realistic or artistic human arm, or a collection of lines. A virtual appurtenance as used with reference to this example refers to a virtual display feature that interconnects a video avatars such as video avatar 206 and a position corresponding to interaction with the 3D image. An articulated appurtenance is used so that the appurtenance can be moved into position with minimal occlusion of the 3D image. Display features such as video avatar 206, 3D image 208, virtual appurtenance 210, and virtual hands 212 are rendered in a virtual 3D space presented as a background. In this example, the virtual 3D space appears as a conference room with features such as, for example, wall art 214.

Figure 3:
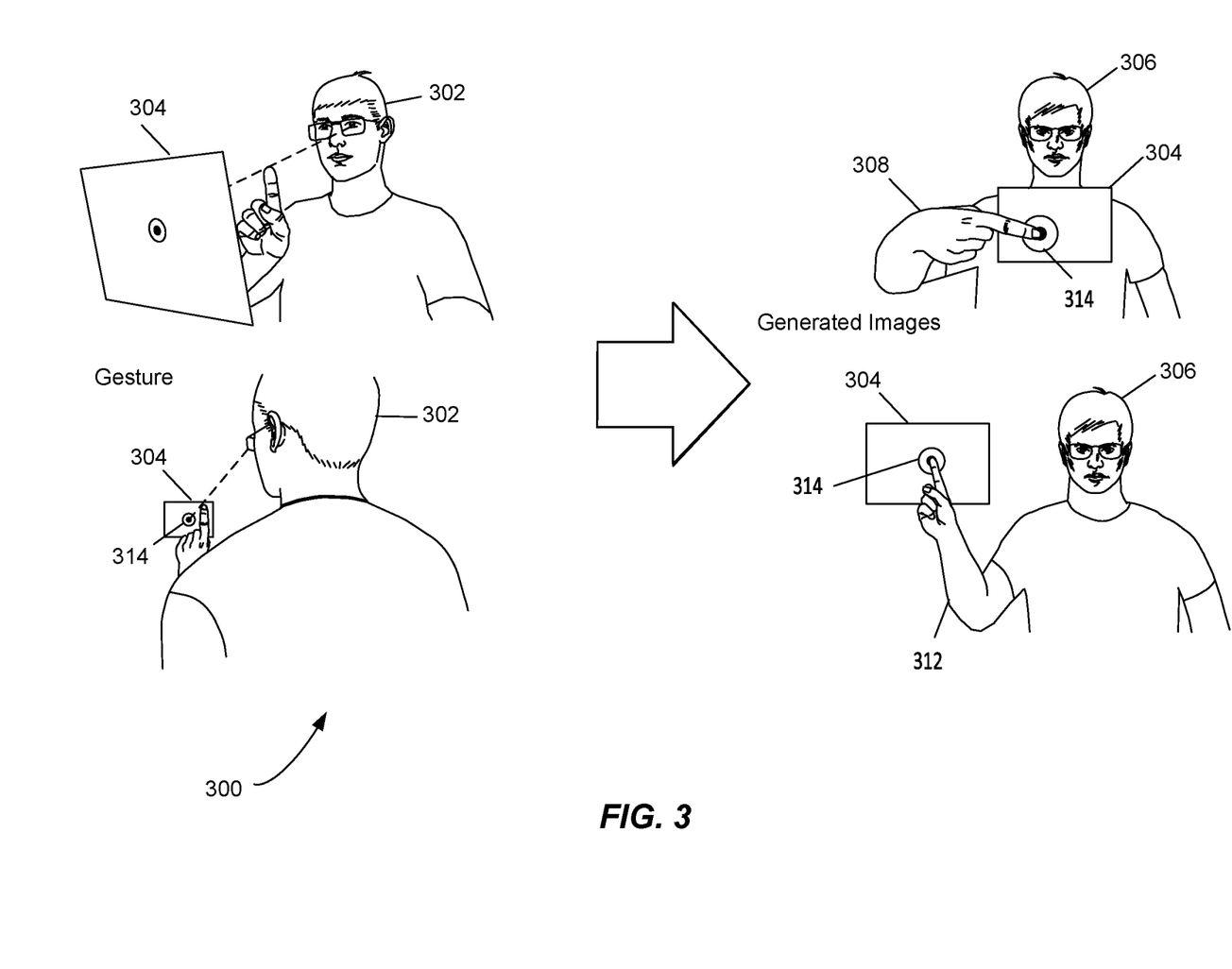
FIG. 3 depicts an example of a transformation of perspective provided by virtual 3D pointing and manipulation according to certain embodiments.

FIG. 3 depicts an example of a transformation 300 of perspective as carried out in a system for virtual 3D pointing and manipulation according to certain embodiments. In one alternative, the natural gesture of a presenter 302 interacting with a 3D virtual object 304 is automatically transformed in perspective in response to positional input, resulting in a displayed interaction of video avatar 306 with virtual 3D object 304 as indicated by articulated virtual appurtenance 308. In another alternative, the natural gesture of a presenter 302 interacting with 3D virtual object 304 is automatically transformed in perspective in response to positional input, resulting in a displayed interaction of video avatar 306 with virtual 3D object 304 as indicated by articulated virtual appurtenance 312. These two alternatives are equally effective and may be selected either through input received at the viewer client device or by the system depending on relative sizes of objects, the nature of any virtual 3D space, or other factors.

In either example shown in FIG. 3, the articulated virtual appurtenance is displayed as connectably associated with the positional input, the 3D image, and the presenter avatar. The articulated virtual appurtenance and the 3D image appear naturally positioned for the interaction with respect to the viewer. In the images to the left of the arrow, presenter 302 views the virtual object 304 so that the target location 314 on the object is visible. In a virtual conference where a viewer is virtually positioned opposite the presenter on the other side of the object, the viewer would not be able to determine where the presenter is pointing. In the actual gesture, even if captured by a camera pointed in the presenter's direction, the target location, the finger, and possibly even the presenter's face may be obstructed. The viewer may only see the "back" of object 304.

The images on the right side of the arrow in FIG. 3 are generated by the system so that the gesture is visualized through the use of the virtual appurtenance. Rendering such a gesture in this manner provides a visible, virtual interaction with the 3D image by the presenter video avatar. Additionally, the viewer will be able to see facial expressions of the presenter as represented by the video avatar, which will display the presenter's expressions in real time. The system converts the "pointing for me" gesture of the presenter into an "pointing for you" gesture for the viewer so that the view of the displayed virtual interaction appears naturally positioned on the viewer's client device.

Both FIG. 2 and FIG. 3 indicate, as an example, positional input indicative of interaction with the virtual 3D object provided by touch or body movement. However, positional input could just as easily be provided by clicking or moving a mouse, touching with a stylus, or clicking buttons on or movement of a trackpad, trackball, or the like. Any or all of these actions may be described as a physical interaction with the 3D image. The articulated virtual appurtenance can still be generated by the system and provide an appropriate virtual interaction to a viewer. Similarly, movement of the object can be accomplished with any input device, for example, with a mouse by clicking and dragging. An image of hands or a hand can be provided as feedback with any such input.

Figure 4:
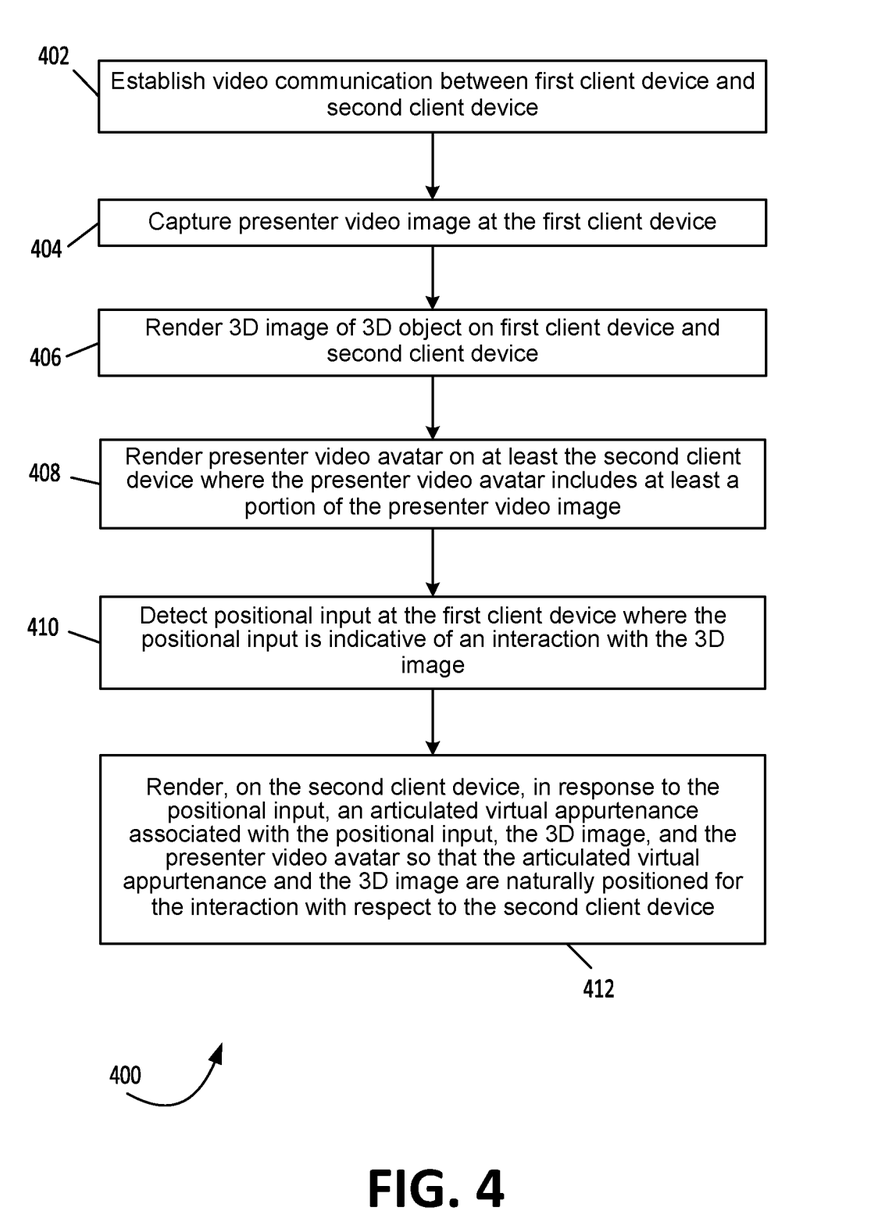
FIG. 4 is a flowchart of an example of a process for virtual 3D pointing and manipulation according to certain embodiments.

FIG. 4 is a flowchart of an example of a process 400 for 3D pointing and manipulation according to certain embodiments. In this example, a computing device carries out the process by executing suitable program code, for example, computer program code for presentation application 102. At block 402, the computing device establishes video communication with another computing device. For example, video communication is established between a first client device and a second client device. At block 404, the computing device captures a presenter video image at the first client device. For example, camera 140 may be used to capture a presenter video image. At block 406, a 3D image of a 3D object is rendered on the client devices. For example, the 3D object may be rendered on presentation device 108, and on a similar presentation device associated with viewer computing device 146.

Staying with FIG. 4, at block 408, a presenter video avatar is rendered on at least the second client device, for example, viewer computing device 146. The presenter video avatar includes at least a portion of the presenter video image. The presenter video avatar may be rendered on the first client device as well, and on other client devices if there are more than two client devices participating in the video communication. In one example, the same or a similar version of presentation application 102 runs on both the first client device and the second client device and is used to render corresponding video avatars on both devices. Computer program instructions on an intermediate server may also participate in the rendering process, for the 3D image and any video avatars.

At block 410 of process 400, positional input is detected at the first client device. The positional input is indicative of an interaction with the 3D image. At block 412, an articulated virtual appurtenance is rendered on at least the second client device, and may be rendered on multiple or all client devices. The appurtenance connects, or is associated with, the positional input, the 3D image, and the presenter video avatar. The articulated virtual appurtenance and the 3D image are naturally positioned for the interaction with respect to the second client device, and optionally, for any or all client devices on which the virtual interaction is viewed.

Figure 5:
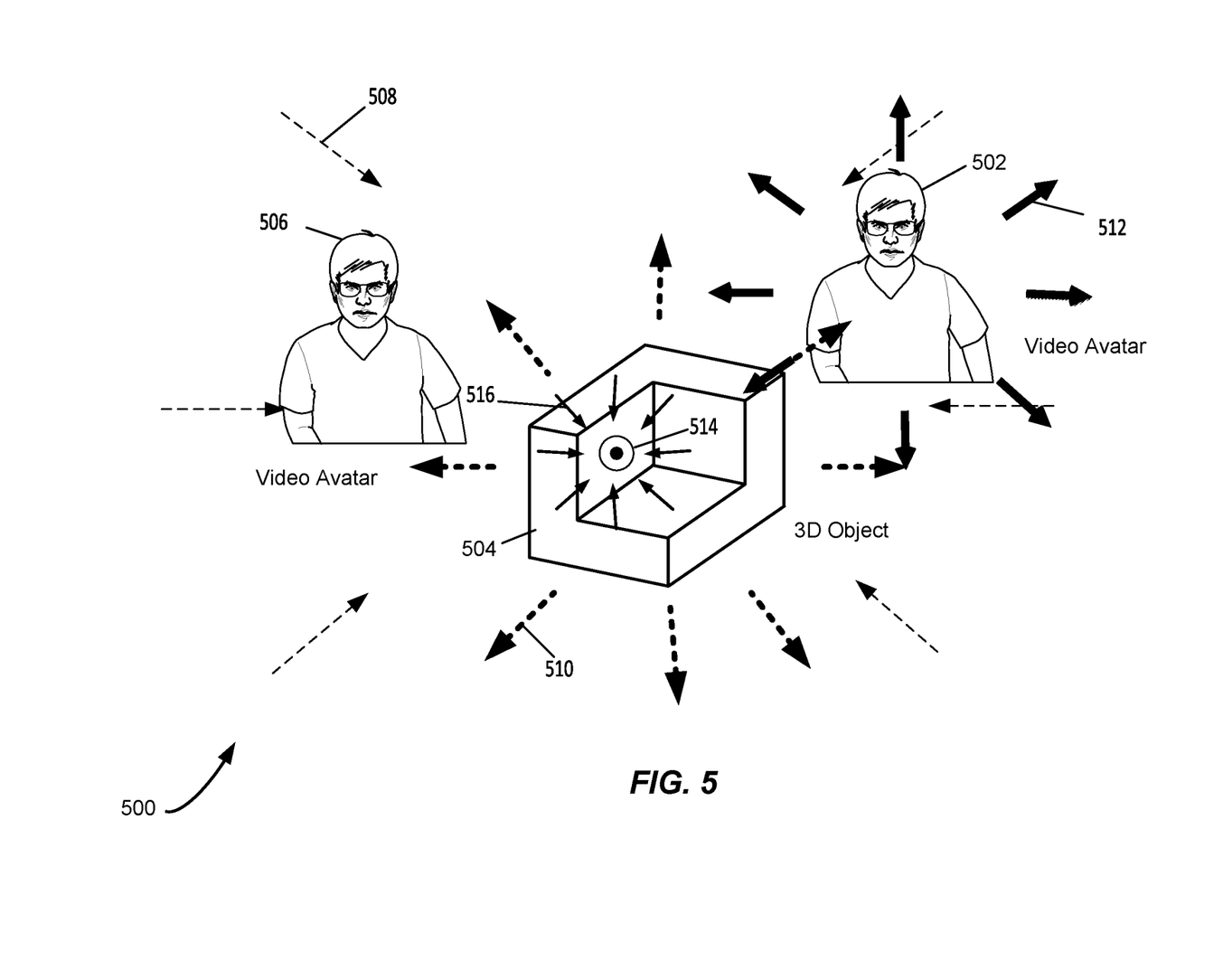
FIG. 5 depicts an example of the forces exerted by a force model for displaying 3D pointing and manipulation according to certain embodiments.

FIG. 5 depicts an example of the forces exerted in a force model for displaying 3D pointing and manipulation according to certain embodiments. Force model 500 initially acts on a presenter avatar 502 and the virtual 3D object 504 and all objects are at equilibrium. An added viewer avatar 506 is placed (rendered) in the scene, and the force model moves all objects into equilibrium. The force model includes a weak global force indicated by arrows 508 that pushes all avatars towards the center of the scene. The force model further includes a strong, pushing force indicated by arrows 510. This strong force pushes each avatar in a scene away from virtual 3D object 504. A repulsive force pushes avatars away from each other, for example, it pushes added avatar 506 away from avatar 502. This repulsive force is indicated by arrows 512. A dragging force emitted by pointing target 514 pulls or drags the added avatar 506, for example a video avatar corresponding to the presenter client device leading up to an interaction with the object, towards the pointing target 514. The dragging force is indicated by arrows 516.

The force model 500 is used to eliminate occlusion of the avatars, or the 3D image, by each other. The use of the force model provides a system that can efficiently present relatively complex 3D interactions in real time or near real time. The force model provides a way to augment the position of the a remote user's video avatar, so that the video avatar is not blocked by being too close to the virtual 3D object, which in turn aids in rendering the virtual appurtenance in a more natural way. The force model optimizes the positioning between the 3D object and the avatars.

Figure 6:
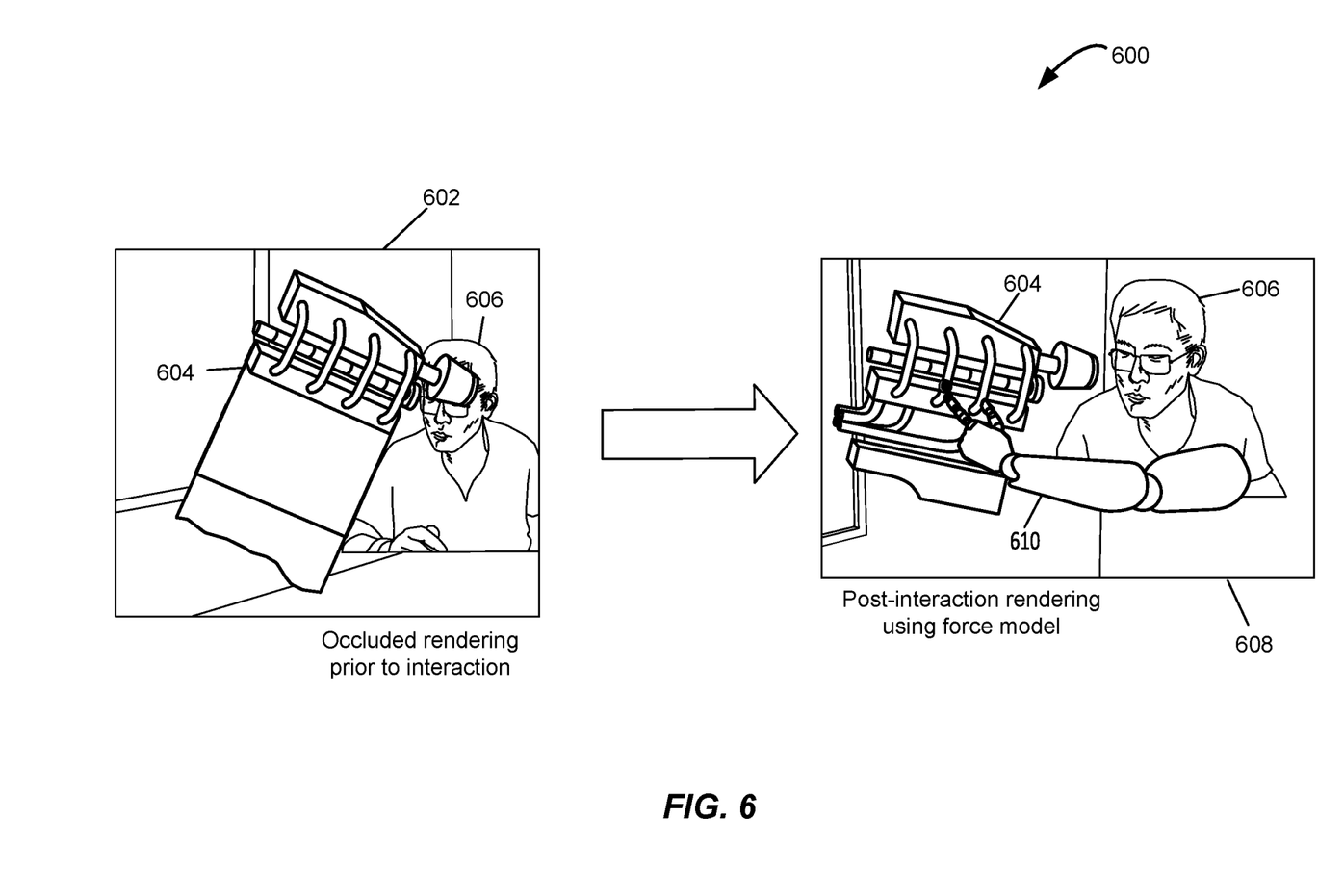
FIG. 6 depicts an example of a transition in a screen display illustrating how display features are moved to avoid occlusion during 3D pointing and manipulation according to certain embodiments.

FIG. 6 depicts an example of a transition 600 that takes place in a screen display when displayed features are moved to avoid occlusion during 3D pointing and manipulation according to certain embodiments. This movement results from application of the force model described above with respect to FIG. 5. In screen shot 602, virtual 3D object 604 is occluding a new video avatar 606. In screen shot 608, the client device corresponding to video avatar 606 has detected a pointing action. In addition to generating and rendering virtual appurtenance 610, the force model has been applied to the scene to move 3D object 604 to a position where it is not occluding video avatar 606. The virtual 3D object has also been rotated to a natural viewing position for the interaction depicted and video avatar 606 has somewhat increased in size, appearing to move closer. Such resizing, either smaller or larger, along with movement to different screen locations, may be referred to herein as positioning or repositioning, since, even if the virtual object's center does not change location, it appears to have moved closer or further from the viewer.

Figure 7:
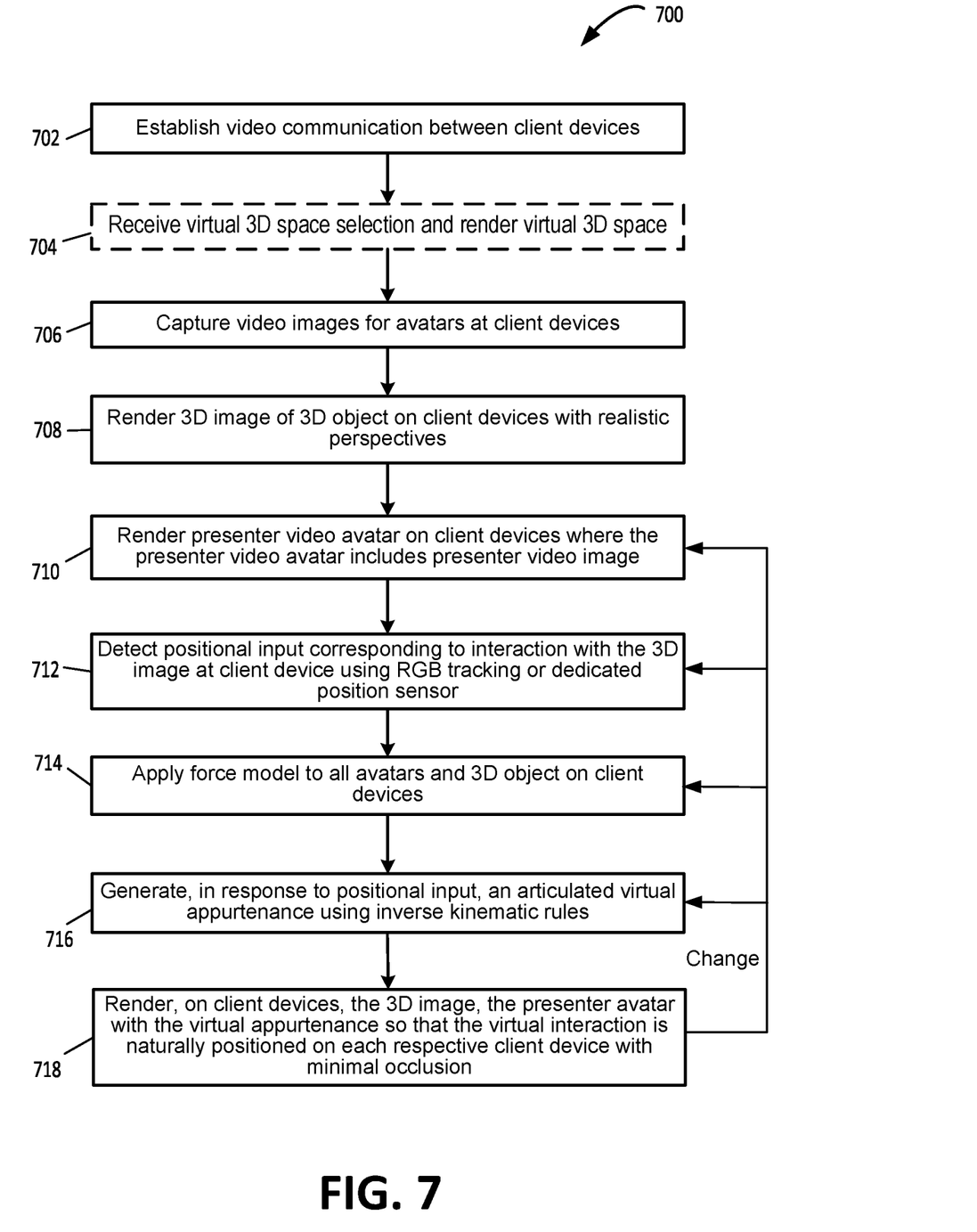
FIG. 7 is a flowchart of another example of a process for virtual 3D pointing and manipulation according to certain embodiments.

FIG. 7 is a flowchart of another example of a process 700 for 3D pointing and manipulation according to certain embodiments. In this example, a computing device carries out the process by executing suitable program code, for example, computer program code for presentation application 102. Process 700 may also be carried out by program code distributed to multiple computing devices, such as client devices and one or more servers or a cloud system. At block 702, video communication is established between computing devices. A variety of software packages are available to implement rich, high-quality real-time communication (RTC) applications.

At block 704, of process 700, one or more computing devices receive a selection of a virtual 3D space and render the virtual 3D space to add realism to displayed interactions. For example, the virtual 3D space may depict an office, laboratory, or factory space. As another example, the virtual 3D space may be a conference room such as that shown in view 204 of FIG. 2. At block 706, video images are captured at client devices in order to render video avatars of various participants. At block 708, the 3D image of the 3D object under consideration is rendered on client devices with realistic perspectives relative to each. At block 710, presenter video avatars are rendered on all client devices. Each presenter video avatar includes at least a portion of a live video image, for example, a facial portion so that viewers can perceive facial expressions.

Still referring to FIG. 7, at block 712, positional input is detected. The positional input in this example corresponds to an interaction with the 3D image at a client device. This positional input, as examples, is detected using RGB tracking by a camera or using a dedicated position sensor such as position sensor 142. At block 714, force model 500 is applied to all displayed video avatars and the 3D object as displayed on multiple client devices. At block 716, the articulated virtual appurtenance is generated using inverse kinematic rules based on the detected interaction. Inverse kinematics characterizes motion without necessarily understanding the cause of the motion. For example, inverse kinematic rules are applied to cause a robot to move as desired. Inverse kinematics can also be used to generate virtual characters from body racking sensors for computer animation, movie production, and gaming. In one example, an inverse kinematics software package from a gaming platform such as one supplied by Unity Software, Inc. of San Francisco, Calif., United States, is used to generate the virtual appurtenance for the presentation application described herein.

At block 718 of process 700, the presenter video avatar and the 3D image are rendered with the virtual appurtenance on multiple client devices so that the virtual interaction is naturally positioned with respect to each client device and exhibits minimal occlusion. Process 700 also includes feedback to block 710, block 712, block 714, and/or block 716 when and if there is a change in positional input at a presenter client device or the 3D object is moved by input received at any other client device, for example, using virtual hands 212 shown in FIG. 2. Although the application of the force model is shown in block 714, in this example, the feedback arrows represent the force model being continuously applied and reapplied whenever changes are detected so as to minimize occlusion of one virtual object by another and to present a natural viewing perspective on each client device that is rendering the relevant interaction. The functions included in block 714, block 716, and block 718, as well as the feedback, all discussed with respect to FIG. 7, can be used in implementing a step for rendering, in response to the positional input, a virtual interaction of the presenter avatar with the 3D image, wherein the virtual interaction corresponds to the physical interaction and is naturally positioned for each client device.

Figure 8:
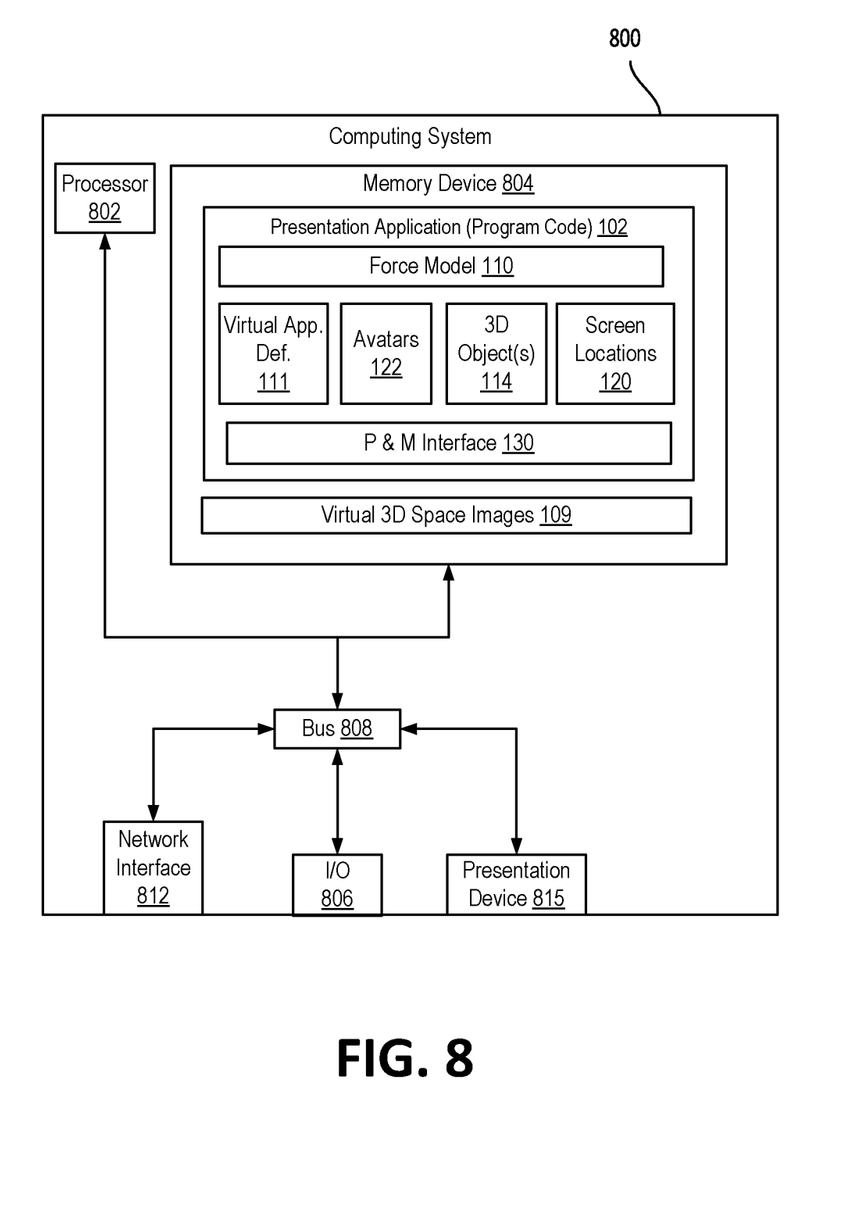
FIG. 8 is a diagram of an example of a computing system that can implement 3D pointing and manipulation according to certain embodiments.

FIG. 8 depicts a computing system 800 that executes the presentation application 102 with the capability of virtual 3D pointing and manipulation according to embodiments described herein. System 800 includes a processor 802 communicatively coupled to one or more memory devices 804. The processor 802 executes computer-executable program code stored in the memory device 804. Examples of the processor 802 include a microprocessor, an application-specific integrated circuit ("ASIC"), a field-programmable gate array ("FPGA"), or any other suitable processing device. The processor 802 can include any number of processing devices, including a single processing device. The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

Still referring to FIG. 8, the computing system 800 may also include a number of external or internal devices, for example, input or output devices. For example, the computing system 800 is shown with one or more input/output ("I/O") interfaces 806. An I/O interface 806 can receive input from input devices or provide output to output devices (not shown). One or more buses 808 are also included in the computing system 800. The bus 808 communicatively couples one or more components of a respective one of the computing system 800. The processor 802 executes program code that configures the computing system 800 to perform one or more of the operations described herein. The program code includes, for example, presentation application 102, or other suitable applications that perform one or more operations described herein. The program code may be resident in the memory device 804 or any suitable computer-readable medium and may be executed by the processor 802 or any other suitable processor. Memory device 804, during operation of the computing system, provides executable portions of the presentation application, for example, force model 110, and pointing and manipulation interface 130 for access by the processor 802 as needed. Memory device 804 is also used to temporarily store video avatars 122, screen location information 120, and other information or data structures, shown or not shown in FIG. 8, as needed.

The system 800 of FIG. 8 also includes a network interface device 812. The network interface device 812 includes any device or group of devices suitable for establishing a wired or wireless data connection to one or more data networks. Non-limiting examples of the network interface device 812 include an Ethernet network adapter, a wireless network adapter, and/or the like. The system 800 is able to communicate with one or more other computing devices (e.g., another computing device executing software, for a videoconferencing service or another client device, not shown) via a data network (not shown) using the network interface device 812. Network interface device 812 can also be used to communicate with network or cloud storage used as a repository for images of 3D object for which collaboration is planned with the presentation application 102. Such network or cloud storage can also include updated or archived versions of the presentation application for distribution and installation.

Staying with FIG. 8, in some embodiments, the computing system 800 also includes the presentation device 815 depicted in FIG. 8. A presentation device 815 can include any device or group of devices suitable for providing visual, auditory, or other suitable sensory output. In examples, presentation device 815 displays 3D object images, virtual appurtenances, and video avatars. Non-limiting examples of the presentation device 815 include a touchscreen, a monitor, a separate mobile computing device, etc. In some aspects, the presentation device 815 can include a remote client-computing device that communicates with the computing system 800 using one or more data networks. System 800 may be implemented as a unitary computing device, for example, a notebook or mobile computer. Alternatively, as an example, the various devices included in system 800 may be distributed and interconnected by interfaces or a network, with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "accessing" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method comprising:
   establishing video communication between a first client device and a second client device;
   capturing a presenter video image at the first client device;
   causing a 3D image of a 3D object to be rendered on the first client device and on the second client device;
   causing a presenter avatar to be rendered on at least the second client device, the presenter avatar including at least a portion of the presenter video image;
   detecting a positional input at the first client device, the positional input indicative of an interaction with the 3D image;
   causing, using a force model associated with the 3D image, a positioning of the presenter avatar and the 3D image on the second client device; and
   causing, in response to the positional input and based on the positioning using the force model, an articulated virtual appurtenance to be rendered on the second client device as connectably associated with the positional input, the 3D image, and the presenter avatar, the articulated virtual appurtenance and the 3D image being naturally positioned for the interaction with respect to the second client device.

2. The computer-implemented method of claim 1, wherein detecting the positional input further comprises detecting position and/or movement using RGB tracking.

3. The computer-implemented method of claim 1, further comprising:
   causing a virtual 3D space to be rendered on the first client device and the second client device; and
   causing the presenter avatar and the 3D image to be rendered in the virtual 3D space.

4. The computer-implemented method of claim 1, further comprising causing a plurality of avatars corresponding to a plurality of participant client devices to be positioned on the second client device, wherein the plurality of avatars includes the presenter avatar and a viewer avatar.

5. The computer-implemented method of claim 4, further comprising causing the presenter avatar, the viewer avatar, and the 3D image to be positioned on at least one of the first client device or the second client device using the force model to eliminate occlusion of any of the presenter avatar, the viewer avatar, or the 3D image by another of the presenter avatar, the viewer avatar, or the 3D image.

6. The computer-implemented method of claim 4, wherein the force model comprises a global force that pushes the plurality of avatars towards a center, a repulsive force between the plurality of avatars, a pushing force pushing each of the plurality of avatars away from the 3D image, and a dragging force pulling the presenter avatar towards a point of the interaction with the 3D image.

7. The computer-implemented method of claim 1, further comprising defining the articulated virtual appurtenance using inverse kinematic rules.

8. A system comprising:
   a processor; and
   a memory device configured to store a 3D image and a presentation application executable by the processor for performing operations comprising:
      causing a presenter avatar including a video image captured at a first client device to be rendered on at least a second client device;
      detecting a positional input at the first client device, the positional input indicative of an interaction with the 3D image;
      causing, using a force model associated with the 3D image, a positioning of the presenter avatar and the 3D image on the second client device; and
      causing, in response to the positional input and based on the positioning using the force model, an articulated virtual appurtenance to be rendered on the second client device as connectably associated with the positional input, the 3D image, and the presenter avatar, the articulated virtual appurtenance and the 3D image being naturally positioned for the interaction with respect to the second client device.

9. The system of claim 8, wherein the operation of detecting the positional input further comprises detecting position and/or movement using RGB tracking.

10. The system of claim 8, wherein the operations further comprise:
    causing a virtual 3D space to be rendered on the first client device and the second client device; and
    causing the presenter avatar and the 3D image to be rendered in the virtual 3D space.

11. The system of claim 8, wherein the operations further comprise causing a plurality of avatars corresponding to a plurality of participant client devices to be positioned on the second client device, wherein the plurality of avatars includes the presenter avatar and a viewer avatar.

12. The system of claim 11, wherein the operations further comprise causing the presenter avatar, the viewer avatar, and the 3D image to be positioned on at least one of the first client device or the second client device using the force model to eliminate occlusion of any of the presenter avatar, the viewer avatar, or the 3D image by another of the presenter avatar, the viewer avatar, or the 3D image.

13. The system of claim 11, wherein the force model comprises a global force that pushes the plurality of avatars towards a center, a repulsive force between the plurality of avatars, a pushing force pushing each of the plurality of avatars away from the 3D image, and a dragging force pulling the presenter avatar towards a point of the interaction with the 3D image.

14. The system of claim 8, wherein the operations further comprise defining the articulated virtual appurtenance using inverse kinematic rules.

15. A non-transitory computer-readable medium storing program code executable by a processor to perform operations, the operations comprising:
    capturing a presenter video image at a first client device;
    rendering a 3D image of a 3D object on the first client device and on a second client device;
    rendering a presenter avatar on at least the second client device, the presenter avatar including at least a portion of the presenter video image;
    detecting a positional input at the first client device, the positional input indicative of a physical interaction with the 3D image; and
    a step for rendering, in response to the positional input and based on a force model applied to the presenter avatar and the 3D image, a virtual interaction of the presenter avatar with the 3D image, wherein the virtual interaction includes an articulated virtual appurtenance corresponding to the physical interaction and is naturally positioned for the second client device.

16. The non-transitory computer-readable medium of claim 15, wherein the operation of detecting the positional input further comprises detecting position and/or movement using RGB tracking.

17. The non-transitory computer-readable medium of claim 15, wherein the operations further comprise:
   rendering a virtual 3D space on the first client device and the second client device; and
   rendering the presenter avatar and the 3D image in the virtual 3D space.

18. The non-transitory computer-readable medium of claim 15, wherein the operations further comprise positioning the presenter avatar, a viewer avatar, and the 3D image on at least one of the first client device or the second client device using the force model to eliminate occlusion of any of the presenter avatar, the viewer avatar, or the 3D image by another of the presenter avatar, the viewer avatar, or the 3D image.

19. The non-transitory computer-readable medium of claim 18, wherein the force model comprises a global force that pushes the presenter avatar and the viewer avatar towards a center, a repulsive force between the presenter avatar and the viewer avatar, a pushing force pushing each of the presenter avatar and the viewer avatar away from the 3D image, and a dragging force pulling the presenter avatar towards a point of the virtual interaction with the 3D image.

20. The non-transitory computer-readable medium of claim 15, wherein the operations further comprise defining the articulated virtual appurtenance using inverse kinematic rules.

\* \* \* \* \*